United States Patent
Dutta Bordoloi et al.

(10) Patent No.: US 10,686,988 B2
(45) Date of Patent: Jun. 16, 2020

(54) DYNAMIC BATCH SIZE SELECTION FOR VEHICLE CAMERA IMAGE PROCESSING

(71) Applicant: GM GLOBAL TECHNOLOGY OPERATIONS LLC, Detroit, MI (US)

(72) Inventors: Unmesh Dutta Bordoloi, Troy, MI (US); Shige Wang, Northville, MI (US); Stephen G. Lusko, Warren, MI (US); Jinsong Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 190 days.

(21) Appl. No.: 15/950,587

(22) Filed: Apr. 11, 2018

(65) Prior Publication Data

US 2019/0320115 A1    Oct. 17, 2019

(51) Int. Cl.
*H04N 5/232* (2006.01)
*G06N 3/04* (2006.01)
*B60R 1/00* (2006.01)

(52) U.S. Cl.
CPC .......... *H04N 5/23245* (2013.01); *B60R 1/00* (2013.01); *G06N 3/04* (2013.01); *H04N 5/23216* (2013.01); *B60R 2300/105* (2013.01); *B60R 2300/303* (2013.01); *B60R 2300/607* (2013.01); *B60R 2300/806* (2013.01); *B60R 2300/8066* (2013.01); *B60R 2300/8093* (2013.01)

(58) Field of Classification Search
CPC .................................................. H04N 5/23245
USPC .......................................................... 348/148
See application file for complete search history.

(56) References Cited

U.S. PATENT DOCUMENTS

2006/0164514 A1* 7/2006 Muramatsu ............... B60R 1/00
                                                   348/207.99
2018/0376067 A1* 12/2018 Martineau ............ H04N 5/2353

* cited by examiner

*Primary Examiner* — Yulin Sun
(74) *Attorney, Agent, or Firm* — Cantor Colburn LLP

(57) ABSTRACT

Examples of techniques for dynamically selecting a batch size used in vehicle camera image processing are disclosed. In one example implementation, a method includes generating, by a processing device, a batch table and a mode table. The method further includes determining, by the processing device, image processing performance requirements for a current mode of a vehicle using the mode table, the vehicle comprising a plurality of cameras configured to capture a plurality of images. The method further includes selecting, by the processing device, a batch size and a processing frequency based at least in part on the image processing performance requirements for the current mode of the vehicle. The method further includes processing, by an accelerator, at least a subset of the plurality of images based at least in part on the batch size and processing frequency.

20 Claims, 9 Drawing Sheets

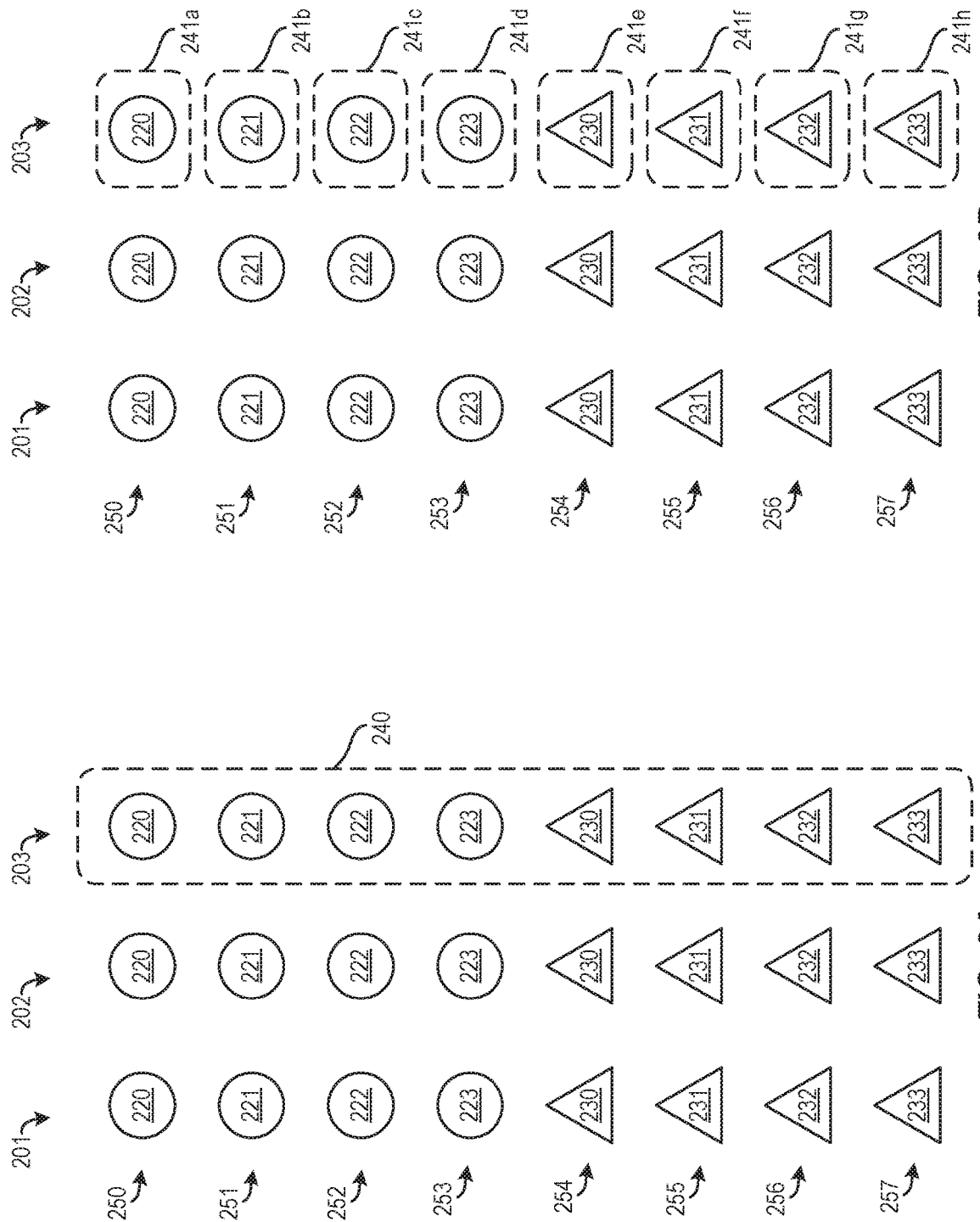

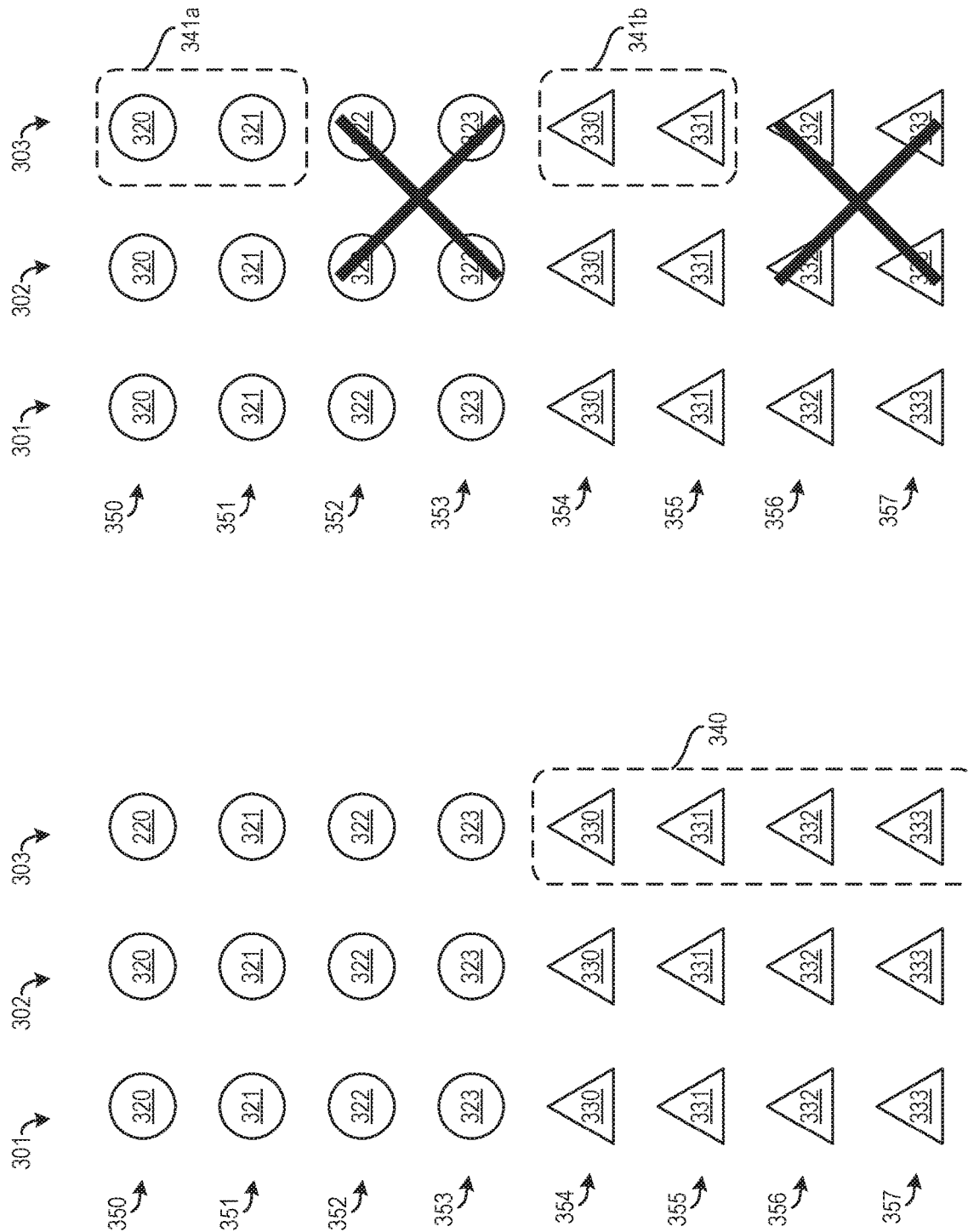

516 ↘

| 702 | 704 | 706 |
|---|---|---|
| 2 | 400 | 10ms |
| 4 | 400 | 15ms |
| 8 | 400 | 20ms |
| 2 | 800 | 5ms |
| 4 | 800 | 7ms |
| 8 | 800 | 9ms |

| 802 | 804 | 806 |
|---|---|---|
| 802a | 804a | 12ms |
| 802b | 804b | 18ms |
| 802c | 804c | 5ms |

*FIG. 8*

DYNAMIC BATCH SIZE SELECTION FOR VEHICLE CAMERA IMAGE PROCESSING

INTRODUCTION

The present disclosure relates to dynamic batch size selection for vehicle camera image processing.

Modern vehicles (e.g., a car, a motorcycle, a boat, or any other type of automobile) generally include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

These vehicles may also be equipped with an in-vehicle display (e.g., a touchscreen) that is used to display camera images and/or other images to a driver of the vehicle. For example, a traditional rear-view mirror and/or side-view mirror may be replaced with a display that displays a camera image from a camera positioned at the rear of the vehicle to display the "rear view" to the driver in place of the traditional rear-view mirror.

SUMMARY

In one exemplary embodiment, a computer-implemented method includes generating, by a processing device, a batch table and a mode table. The method further includes determining, by the processing device, image processing performance requirements for a current mode of a vehicle using the mode table, the vehicle comprising a plurality of cameras configured to capture a plurality of images. The method further includes selecting, by the processing device, a batch size and a processing frequency based at least in part on the image processing performance requirements for the current mode of the vehicle. The method further includes processing, by an accelerator, at least a subset of the plurality of images based at least in part on the batch size and processing frequency.

In additional examples, the method includes determining, by the processing device, whether the batch size is greater than a number of the plurality of cameras. In additional examples, the method includes, based at least in part on determining that the batch size is greater than the number of the plurality of cameras, setting a batch size b equal to a number of frames remaining in a current column and (b−r) % n frames from a next column, where b represents the batch size, r represents the frames remaining in a current column, and n represents a number of cameras. In additional examples, the method includes, based at least in part on determining that the batch size is not greater than the number of the plurality of cameras, setting a batch size b equal to a number of r frames remaining in a current column and (b−r) frames in a next column, where b represents the batch size and r represents the frames remaining in a current column. In some example methods, the current mode of the vehicle is selected from the group consisting of a highway driving mode, an urban driving mode, a parking mode, and a degraded mode. In some example methods, processing the at least a subset of the plurality of images is performed using a convolutional neural network. In some example methods, the batch table includes a plurality of batch sizes, each of the plurality of batch sizes having a frequency value and a latency value associated therewith. In some example methods, the mode table includes a plurality of modes of the vehicle, each of the plurality of modes having a camera configuration value and a latency requirement associated therewith. In some example methods, the plurality of cameras includes at least one surround view camera and at least one long range camera. In additional examples, the method includes, prior to the processing, determining, by the processing device, whether a latency requirement is met based at least in part on the batch size. In additional examples, the method includes, based at least in part on determining that the latency requirement is not met, reverting, by the processing device, to a safe batch size, wherein the safe batch size is used to perform the processing.

In another exemplary embodiment a system includes a memory having computer readable instructions and a processing device for executing the computer readable instructions for performing a method. The method includes generating, by a processing device, a batch table and a mode table. The method further includes determining, by the processing device, image processing performance requirements for a current mode of a vehicle using the mode table, the vehicle comprising a plurality of cameras configured to capture a plurality of images. The method further includes selecting, by the processing device, a batch size and a processing frequency based at least in part on the image processing performance requirements for the current mode of the vehicle. The method further includes processing, by an accelerator, at least a subset of the plurality of images based at least in part on the batch size and processing frequency.

In additional examples, the method includes determining, by the processing device, whether the batch size is greater than a number of the plurality of cameras. In additional examples, the method includes, based at least in part on determining that the batch size is greater than the number of the plurality of cameras, setting a batch size b equal to a number of frames remaining in a current column and (b−r) % n frames from a next column, where b represents the batch size, r represents the frames remaining in a current column, and n represents a number of cameras. In additional examples, the method includes, based at least in part on determining that the batch size is not greater than the number of the plurality of cameras, setting a batch size b equal to a number of r frames remaining in a current column and (b−r) frames in a next column, where b represents the batch size and r represents the frames remaining in a current column. In some example methods, the current mode of the vehicle is selected from the group consisting of a highway driving mode, an urban driving mode, a parking mode, and a degraded mode. In some example methods, processing the at least a subset of the plurality of images is performed using a convolutional neural network. In some example methods, the batch table includes a plurality of batch sizes, each of the plurality of batch sizes having a frequency value and a latency value associated therewith. In some example methods, the mode table includes a plurality of modes of the vehicle, each of the plurality of modes having a camera configuration value and a latency requirement associated therewith.

In yet another exemplary embodiment a computer program product includes a computer readable storage medium having program instructions embodied therewith, wherein the computer readable storage medium is not a transitory signal per se, the program instructions executable by a processing device to cause the processing device to perform a method. The method includes generating, by a processing device, a batch table and a mode table. The method further includes determining, by the processing device, image processing performance requirements for a current mode of a vehicle using the mode table, the vehicle comprising a plurality of cameras configured to capture a plurality of images. The method further includes selecting, by the processing device, a batch size and a processing frequency based at least in part on the image processing performance requirements for the current mode of the vehicle. The method further includes processing, by an accelerator, at least a subset of the plurality of images based at least in part on the batch size and processing frequency.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIGS. 2A and 2B depict examples of static batches;

FIG. 3 depicts an example of a dynamic batch determined using dynamic batch size selection according to aspects of the present disclosure;

FIG. 4 depicts an example of a dynamic batch determined using dynamic batch size selection according to aspects of the present disclosure;

FIG. 7 depicts a batch table according to aspects of the present disclosure;

FIG. 8 depicts a mode table according to aspects of the present disclosure;

DETAILED DESCRIPTION

Figure 1:
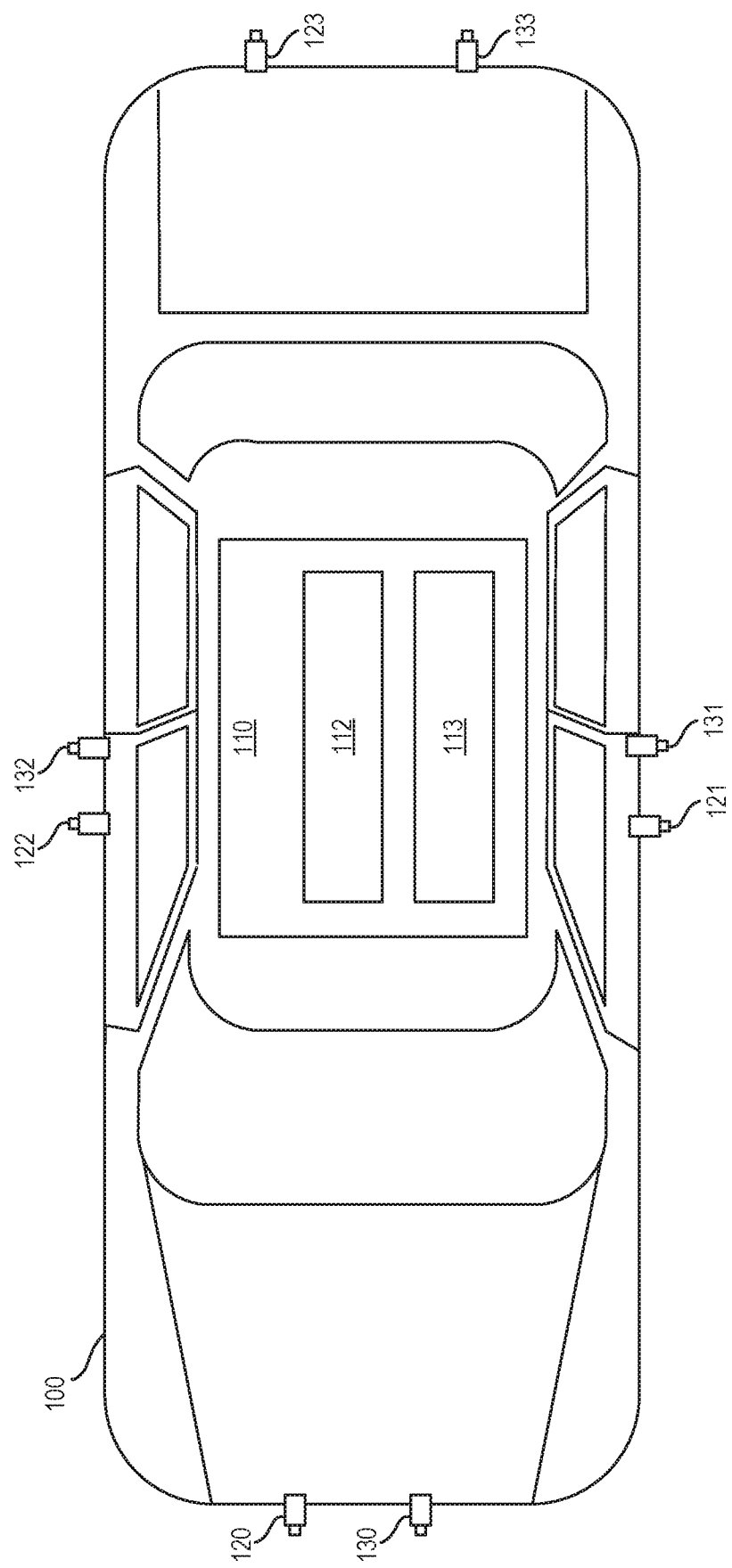
FIG. 1 depicts a vehicle including cameras and a processing system for dynamic batch size selection according to aspects of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for dynamic batch size selection for image processing. Vehicles often implement multiple cameras to capture images external to the vehicle, such as for object detection, collision avoidance, autonomous operation, etc. or to provide information to a driver/operator of the vehicle. A vehicle can be equipped with various types of cameras (e.g., long-range cameras, surround view cameras, etc.) of different numbers (e.g., one camera per side/end, two cameras per side/end). As a result of the number of cameras, the number of images captured can be computationally intensive to process.

The present disclosure describes techniques to dynamically select a batch size. The batch size is a number of frames dispatched to an image processing device (e.g., an accelerator) that processes the images, such as using a convolutional neural network on another suitable image processing technique. The present techniques support dynamic camera configuration (i.e., selection of a subset of cameras) while striking a balance between feature availability and system performance. The present techniques optimize compute resource demand based on system performance and future mode (i.e., an operating mode of the vehicle) requirements. Accordingly, the present techniques reduce latency in convolutional neural network computing for object detection, and reduce power consumption and system utilization, by reducing data movement throughout the system.

FIG. 1 depicts a vehicle 100 including a processing system 110 for dynamic batch size selection for vehicle camera image processing according to aspects of the present disclosure. In particular, the vehicle 100 may include the processing system 110, cameras 120, 121, 122, 123, and cameras 130, 131, 132, 133. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

The captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The processing system 110 includes a batch size selection engine 112 and an accelerator 113. The processing system 110 performs dynamic batch size selection in order to process the images captured by the cameras 120-123, 130-133 in a manner that reduces latency when performing object detection and reduces power consumption and system utilization by reducing data movement. Batch size is the size of the job (i.e., number of images) combined as one item and sent to the accelerator 113 (e.g., a graphics processing unit, a processor, etc.) for processing.

The batch size selection engine 112 performs batch size selection using an offline portion and an online (runtime) portion. The offline portion builds a batch table that contains various batch sizes. For each such entry in the batch table, offline entries can be included regarding throughput versus latency, and this information is then utilized by the online portion.

The batch size selection engine 112 performs the offline portion as follows. First, the batch size selection engine 112 creates a batch table. To create the batch table, the following steps are performed for batch size from 1 to a maximum batch size (size_max). A latency (or "throughput") are computed for different frequency levels, and the batch size, latency, and frequency are stored in the batch table (e.g., <batch size, latency, frequency>). An example of the batch table is depicted in FIG. 7.

After the batch table is created, the batch size selection engine 112 continues the offline portion and creates a mode table with different configurations (modes). Each configuration (mode) has a desired latency requirement. For example, a highway driving mode can utilize four long-range cameras at a frequency of 20 frames per second; an urban driving mode can utilize four long-range cameras and four surround view cameras at a frequency of 10 frames per second; and a degraded mode can use x cameras at y frames per second. It should be appreciated that other modes and latency requirements can also be specified. This effectively sets the batch size for the various modes.

The accelerator 113 uses the batch size to process images from the cameras 120-123, 130-133. The accelerator 113 can be a graphics processing unit (GPU), a network of GPUs, a central processing unit (CPU), a network of CPUs, or another suitable device. The image processing can be performed using a convolutional neural network or other suitable technique.

The various components, modules, engines, etc. described regarding FIG. 1 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., the CPU 1121 of FIG. 11) for executing those instructions. Thus a system memory (e.g., the RAM 1124 of FIG. 11) can store program instructions that when executed by the processing device implement the engines described herein. Other engines can also be utilized to include other features and functionality described in other examples herein.

FIGS. 2A and 2B depict examples of traditional static batches. The static batches have a static batch size that does not change dynamically. Batch size is the size of the job (i.e., number of images) combined as one item and sent to an accelerator (e.g., a graphics processing unit, a processor, etc.) for processing. In these examples, two different static batches are set. FIGS. 2A and 2B show images 220, 221, 222, 223, captured from the cameras 120-123 of FIG. 1 respectively and images 230, 231, 232, 233 captured from the cameras 130-133 of FIG. 1 respectively. These images 220-223 and 230-233 represent frames captured by the cameras 120-123 and 130-133. The images 220-223 and 230-233 are arranged in columns 201, 202, 203 and rows 250, 251, 252, 253, 254, 255, 256, 257. Each column includes images captured at the same moment in time. That is, the images 220-223 and 230-233 of the column 201 were captured at a first moment in time, the images 220-223 and 230-233 of the column 202 were captured at a second moment in time, and the images 220-223 and 230-233 of the column 203 were captured at a third moment in time. Each row 250-257 represents images from one of the cameras 120-123 and 130-133. That is, the images 220 in row 250 are images from the camera 120, the images 221 in row 251 are images from the camera 121, etc.

For each column 201-203, a batch can be set to process the images. In traditional multi-image processing schemes, batches are set statically by developers and the batch size does not change dynamically during runtime or based on operating conditions of a vehicle. FIG. 2A shows a batch 240 that includes all the images 220-223 and 230-233 in the column 203. In this example, all images are batched and sent for processing by the accelerator. Although batching with all images can produce better image processing by providing more data (e.g., for object detection), larger batch sizes consume more memory and therefore more power. Latency can also suffer (i.e., increase) as a result of a larger batch size. It is therefore desirable to use dynamic batch size determination to reduce latency while consuming less memory and less power than traditional techniques.

FIG. 2B shows batches 241a, 241b, 241c, 241d, 241e, 241f, 241g, 241h such that each of the batches 241a-241h is a single image. Single image batch sizes can take longer to process because each batch has to be processed separately. Accordingly, it is desirable to use dynamic batch size determination to select a suitable batch size for different operating conditions.

FIG. 3 depicts examples of dynamic batches determined using dynamic batch size selection according to aspects of the present disclosure. In the example of FIG. 3, images 320, 321, 322, 323, 330, 331, 332, 333 are captured throughout time by each of the cameras 120-123 and 130-133 and are arranged in the columns 301, 302, 303 and rows 350, 351, 352, 353, 354, 355, 356, 357 as shown. A subset of the images is batched processed on the accelerator 113 based on a dynamically determined batch size. The batch size can be based on, for example, a mode of the vehicle 100 and associated camera configuration and latency requirements for the mode. For example, in a highway driving mode, four long-range cameras may be used (e.g., for object avoidance). In such an example, a batch size of "four" is set, with the four images being associated with long-range cameras: the batch 340 includes the images 330, 331, 332, 333 taken with the cameras 130-133, which are long-range cameras.

The example of FIG. 4 may represent a degraded mode where some cameras are not operational. For example, if the cameras 122, 123, 132, 133 become damaged or are otherwise not operational, the batch size can be dynamically changed to exclude images from these cameras. In this case, the images 322, 323, 332, 333 are excluded, and the batch size is set to "two": the batch 341a includes the images 320, 321 and the batch 341b includes the images 330, 331.

Figure 5:
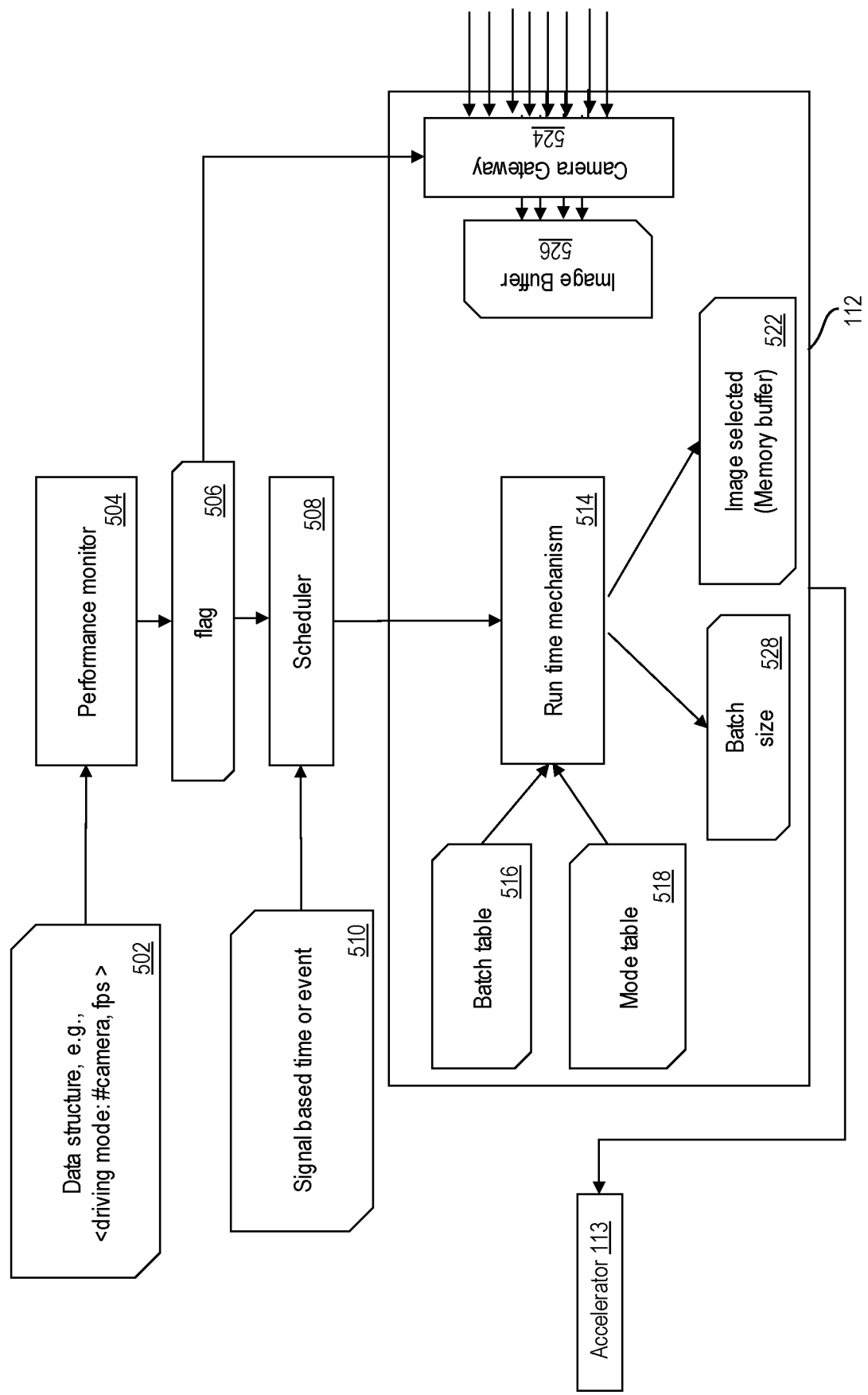
FIG. 5 depicts a block diagram of the batch size selection engine of FIG. 1 according to aspects of the present disclosure.

FIG. 5 depicts a block diagram of the batch size selection engine 112 of FIG. 1 according to aspects of the present disclosure. A data structure 502 (e.g., <driving mode: # number of cameras, frames per second> is entered into a performance monitor 504, which monitors performance of the vehicle 100 and determines the mode of the vehicle. The performance monitor 504 can set various flags 506, which indicate the mode of the vehicle. A scheduler 508 uses the flags 506 and a signal based time or event 510 to initiate a runtime mechanism 514 of the batch size selection engine 112. That is, the scheduler 508 tells the runtime mechanism 514 what mode the vehicle is in.

The runtime mechanism 514 uses a mode table 518 to determine a camera configuration associated with the mode and a latency requirement for the mode. The runtime mechanism 514 uses a batch size table 516 to determine a batch size 528 based on the frequency requirement and a desired frequency (i.e., how often images are captured). Images for a batch can be stored in a memory buffer 522. The images for the batch are passed to the accelerator 113 for processing.

Figure 6:
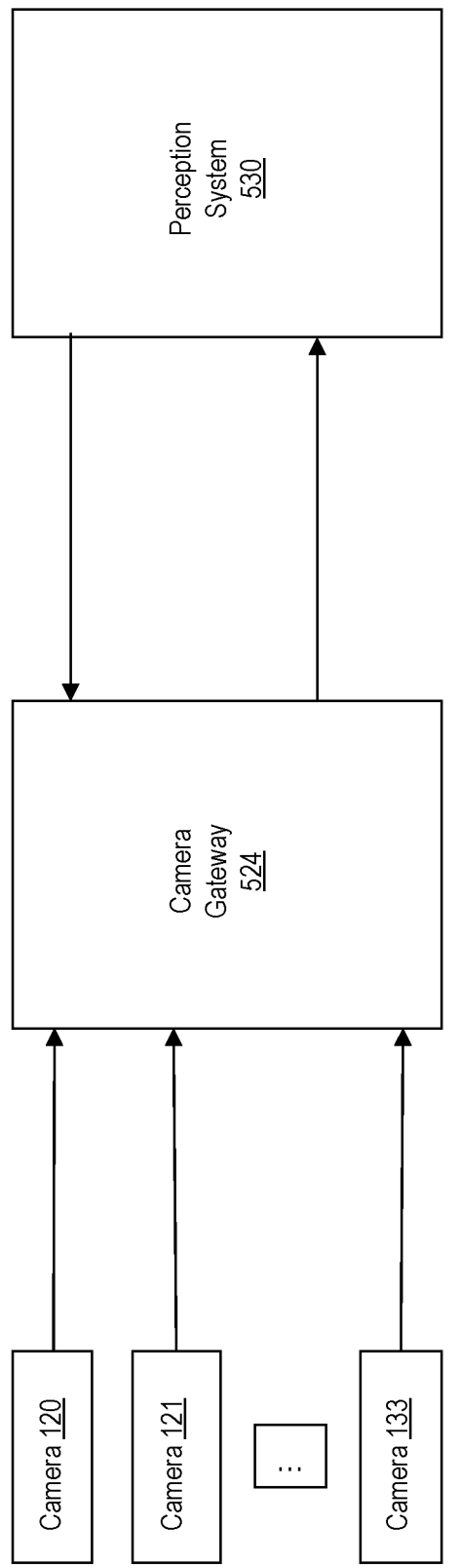
FIG. 6 depicts a block diagram of the camera gateway of FIG. 5 according to aspects of the present disclosure.

The batch size selection engine 112 also uses the flag 506 to determine whether images from certain cameras are passed into an image buffer 526. This is shown in more detail in FIG. 6. In particular, FIG. 6 depicts a block diagram of the camera gateway 524 of FIG. 5 according to aspects of the present disclosure. As depicted in FIG. 6, the cameras 120-123 and 130-133 are connected to the camera gateway 524, and images from the respective cameras are transmitted to the camera gateway 524. The camera gateway 524 acts as a filter to reduce the frames passed to a perception system 530 based on the mode, which is fed into the camera gateway 524 by the perception system 530. This reduces data movement and improves scalability/performance characteristics of the perception system 530. In this example, the perception system 530 includes the various components of FIG. 5 that are responsible for determining the mode and batch size.

FIG. 7 depicts a batch table 516 according to aspects of the present disclosure. The batch table 516 includes various batch sizes 702, and for each of the batch sizes 702, a frequency 704 (how often images are captured) and a latency 706 (how long it takes to transfer the batch) are associated therewith.

FIG. 8 depicts a mode table 518 according to aspects of the present disclosure. The mode table 518 includes various modes 802, and for each of the modes 802, a camera configuration 804 and a latency requirement 806 are associated therewith. The modes 802 can include a highway driving mode 802a, an urban driving mode 802b, and a degraded mode 802c. The highway driving mode 802a uses four long-range cameras (e.g., the cameras 130-133) as its camera configuration 804a and has a latency requirement of 12 milliseconds (ms). The urban driving mode 802a uses four surround view cameras (e.g., the cameras 120-123) as its camera configuration 804b and has a latency requirement of 18 ms. The degraded mode 802c has N number of cameras, which can vary depending on what may be causing the processing system 110 to be degraded (e.g., the system is overloaded, one or more cameras are not operational, etc.). The degraded mode 802c has a latency requirement of 5 ms.

Figure 9:
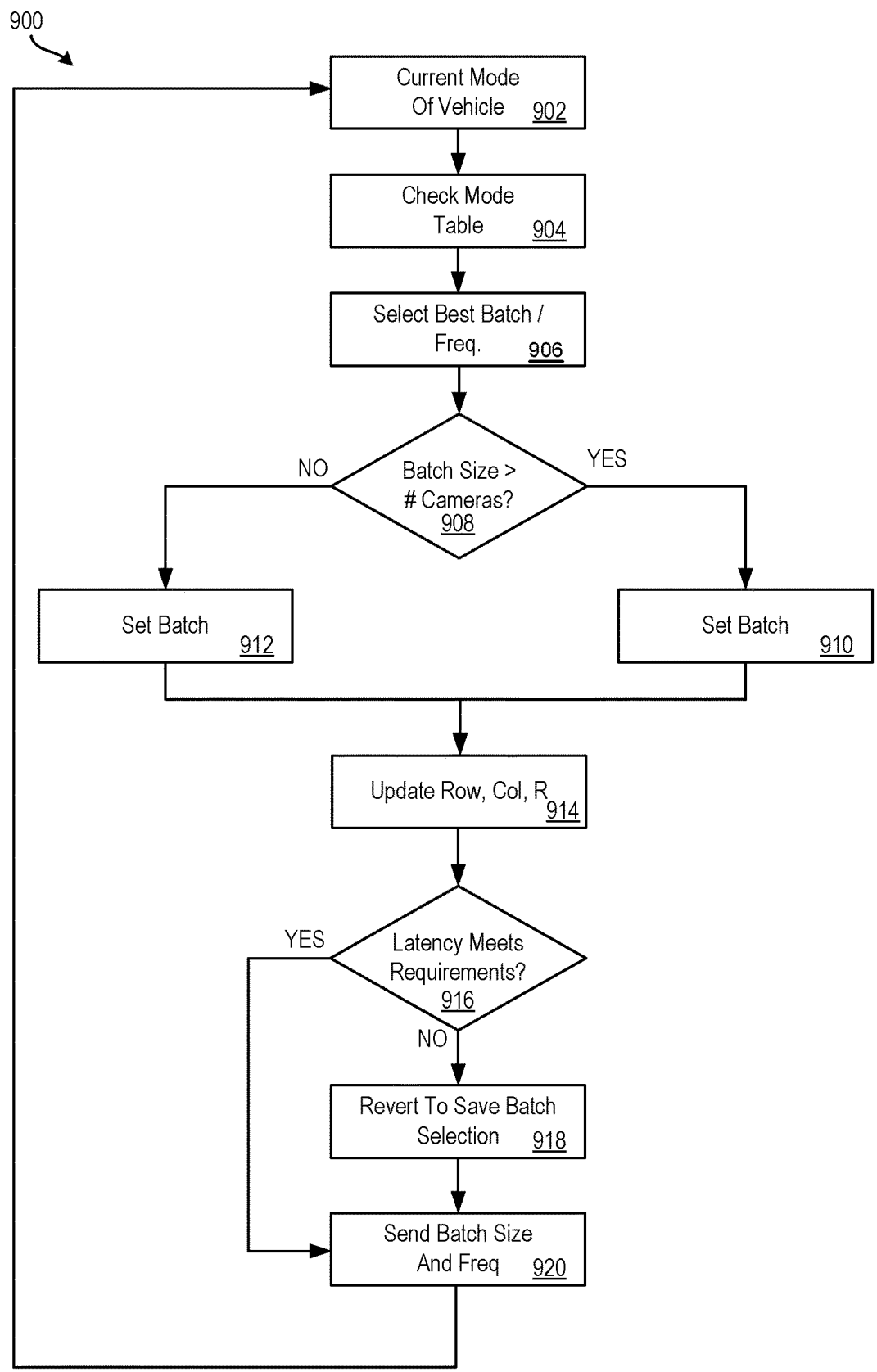
FIG. 9 depicts a flow diagram of a method for dynamic batch size selection according to aspects of the present disclosure.

FIG. 9 depicts a flow diagram of a method 900 for dynamic batch size selection according to aspects of the present disclosure. The method 900 can be performed by any suitable system or device such as the processing system 110 of FIG. 1, the processing system 1100 of FIG. 11, or any other suitable processing system and/or processing device (e.g., a processor).

At block 902, the current mode of the vehicle 100 is determined by querying the vehicle (e.g., an electronic control system within the vehicle) to request the mode of the vehicle. Modes can include, for example, highway driving, urban driving, degraded driving (i.e., less than all of the vehicle's cameras are operational), parking, etc. At block 904, the mode table (e.g., the mode table 518) is referenced to determine performance requirements. For example, with reference to the mode table 518, if the current mode of the vehicle is highway driving, four long-range cameras (e.g., the cameras 130-133) are used, and latency is required to be 12 milliseconds (or less). At block 906, a batch size and frequency for the current mode is selected using the batch table (e.g., the batch table 516). In the example in which latency is required to be 12 milliseconds (or less), the batch table 516 includes four different batch size options with associated frequencies that will provide latency less than 12 milliseconds. Since four long-range cameras are used in this example, the batch size 4 with frequency 800 is selected. This option produces a latency of 9 milliseconds.

Once the batch size/frequency is selected from the batch size table 516, it is determined at decision block 908 whether the batch size is greater than the number of cameras. In the 12 millisecond example above, a batch size of 8 with a frequency of 800 could have been selected from the batch table 512, which would still satisfy the latency requirement. However, in this case, the batch size (8) would be greater than the number of cameras (4) used in the highway driving mode. In this situation (i.e., the batch size is greater than the number of cameras), the method 900 continues to block 910.

At block 910, the batch size b is set to equal r frames remaining in the current column and (b−r) % n from the next column, where b represent the batch size, r represents the frames remaining in the current column, and n represents the number of cameras. As described with reference to FIGS. 3 and 4, the images are arranged in the columns 301, 302, 303 and rows 350, 351, 352, 353, 354, 355, 356, 357 for example.

If it is determined at decision block 908 that the batch size b is not greater than the number of cameras, the method 900 continues to block 912. At block 912, the batch is set to equal r frames remaining in the current column and (b−r) frames in the next column, where r represents the frames remaining in the current column, and b represents the batch size.

Once the batch is set at blocks 910 or 912, the method 900 continues to block 914 to update the current row, column, and r (frames remaining in the current column). At decision block 916, it is determined whether the latency requirements are met. If so, the method 900 continues to block 920. However, if the latency requirements are not met, the method 900 continues to block 918 and reverts to a safe batch selection. A safe batch is the batch size that is selected offline where safe implies that the latency requirements are known to be satisfied when selected. The method 900 then continues to block 920. At block 920, the method 900 sends the batch size and processing frequency to the accelerator 113, which processes the batch of images.

Additional processes also may be included, and it should be understood that the process depicted in FIG. 9 represents an illustration and that other processes may be added or existing processes may be removed, modified, or rearranged without departing from the scope and spirit of the present disclosure.

Figure 10:
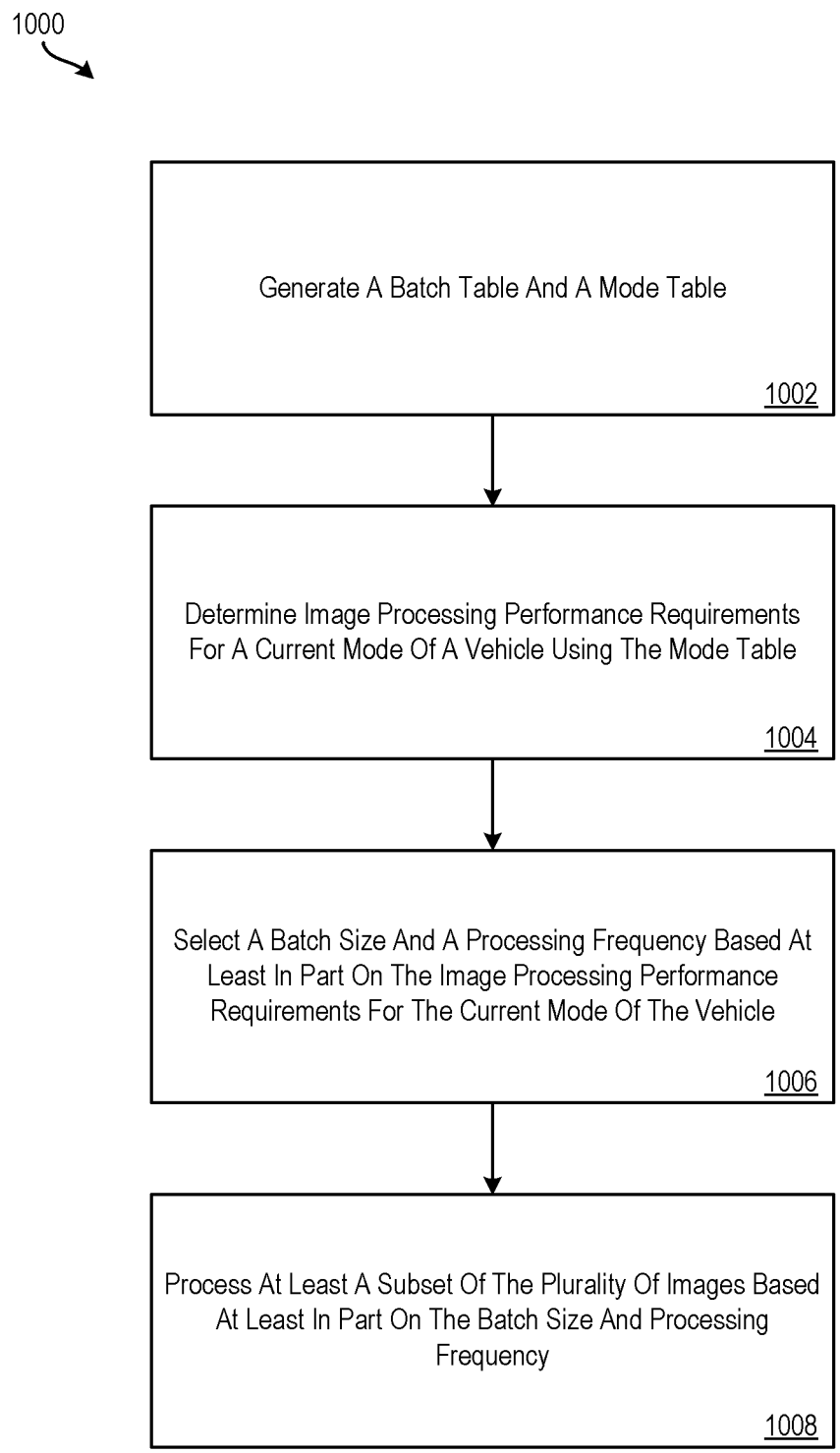
FIG. 10 depicts a flow diagram of a method for dynamic batch size selection according to aspects of the present disclosure.

FIG. 10 depicts a flow diagram of a method 1000 for dynamic batch size selection according to aspects of the present disclosure. The method 1000 can be performed by any suitable processing system and/or processing device, such as the processing system 110 of FIG. 1 and/or the processing system 1100 of FIG. 11.

At block 1002, the batch size selection engine 112 generates a batch table (e.g., the batch table 516) and a mode table (e.g., the mode table 518). The batch table and mode table are generated using the offline portion described herein.

At block 1004, the batch size selection engine 112 determines image processing performance requirements for a current mode of a vehicle (e.g., the vehicle 100) using the mode table. The vehicle includes a plurality of cameras (e.g., the cameras 120-123, 130-133) configured to capture a plurality of images.

At block 1006, the batch size selection engine 112 selects a batch size and a processing frequency based at least in part on the image processing performance requirements for the current mode of the vehicle.

At block 1008, an accelerator (e.g., the accelerator 113) is used to process at least a subset of the plurality of images based, at least in part, on the batch size and processing frequency. That is, the accelerator receives the plurality of images equal to the batch size, and the accelerator processes these images using a suitable image processing technique. According to aspects of the present disclosure, the accelerator can process the images using a convolutional neural network (CNN) or other suitable technique.

Additional processes also may be included, and it should be understood that the process depicted in FIG. 10 represents an illustration, and that other processes may be added or existing processes may be removed, modified, or rearranged without departing from the scope and spirit of the present disclosure.

Figure 11:
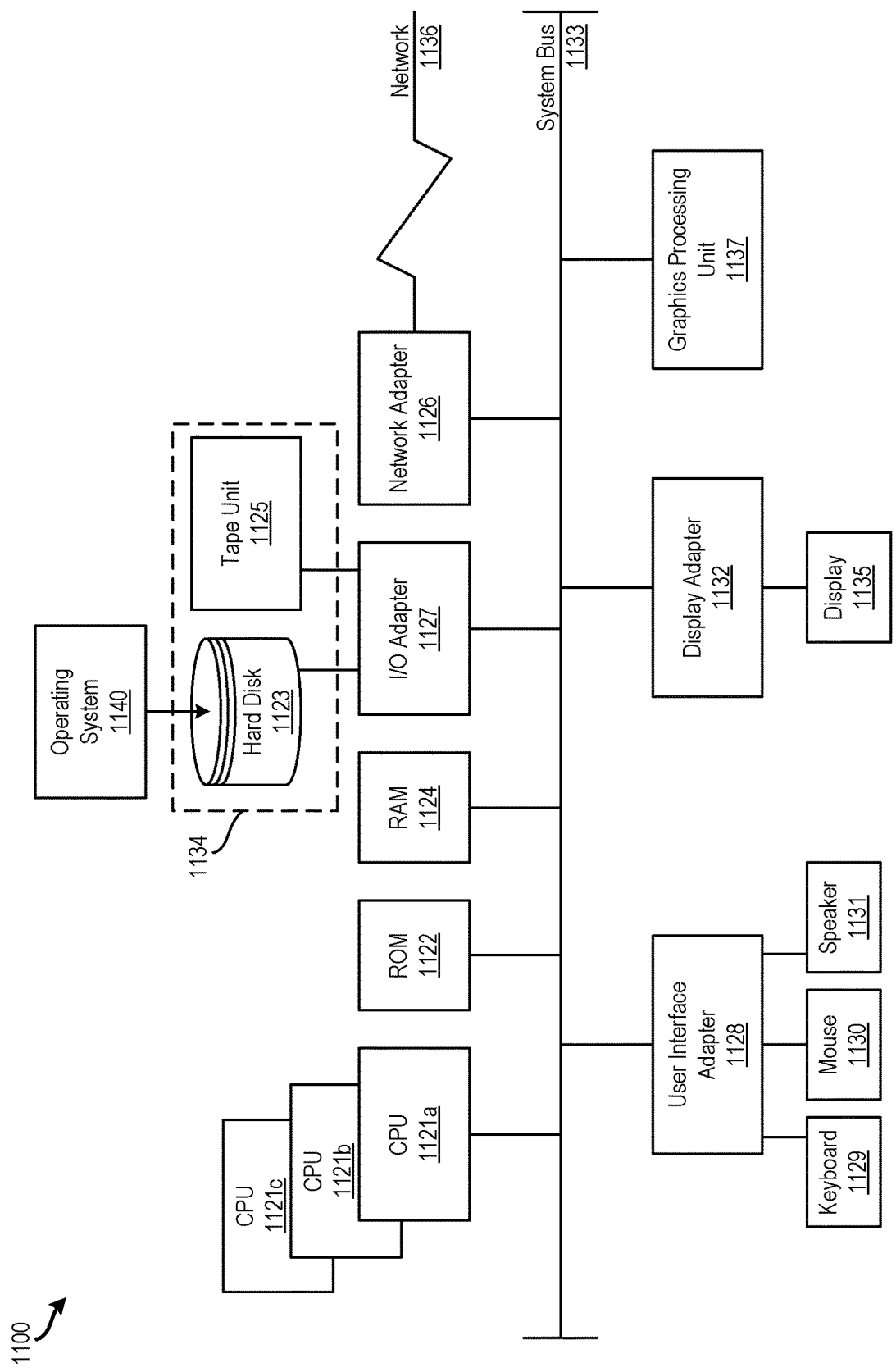
FIG. 11 depicts a block diagram of a processing system for implementing the techniques described herein according to an exemplary embodiment.

It is understood that the present disclosure is capable of being implemented in conjunction with any other type of computing environment now known or later developed. For example, FIG. 11 depicts a block diagram of a processing system 1100 for implementing the techniques described herein. In examples, processing system 1100 has one or more central processing units (processors) 1121a, 1121b, 1121c, etc. (collectively or generically referred to as processor(s) 1121 and/or as processing device(s)). In aspects of the present disclosure, each processor 1121 can include a reduced instruction set computer (RISC) microprocessor. Processors 1121 are coupled to system memory (e.g., random access memory (RAM) 1124) and various other components via a system bus 1133. Read only memory (ROM) 1122 is coupled to system bus 1133 and may include a basic input/output system (BIOS), which controls certain basic functions of processing system 1100.

Further depicted are an input/output (I/O) adapter 1127 and a communications adapter 1126 coupled to system bus 1133. I/O adapter 1127 may be a small computer system interface (SCSI) adapter that communicates with a hard disk 1123 and/or a storage drive 1125 or any other similar component. I/O adapter 1127, hard disk 1123, and storage device 1125 are collectively referred to herein as mass storage 1134. Operating system 1140 for execution on processing system 1100 may be stored in mass storage 1134. A network adapter 1126 interconnects system bus 1133 with an outside network 1136 enabling processing system 1100 to communicate with other such systems.

A display (e.g., a display monitor) 1135 is connected to system bus 1133 by display adaptor 1132, which may include a graphics adapter to improve the performance of graphics intensive applications and a video controller. In one aspect of the present disclosure, adapters 1126, 1127, and/or 1132 may be connected to one or more I/O busses that are connected to system bus 1133 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1133 via user interface adapter 1128 and display adapter 1132. A keyboard 1129, mouse 1130, and speaker 1131 may be interconnected to system bus 1133 via user interface adapter 1128, which may include, for example, a Super I/O chip integrating multiple device adapters into a single integrated circuit.

In some aspects of the present disclosure, processing system 1100 includes a graphics processing unit 1137. Graphics processing unit 1137 is a specialized electronic circuit designed to manipulate and alter memory to accelerate the creation of images in a frame buffer intended for output to a display. In general, graphics processing unit 1137 is very efficient at manipulating computer graphics and image processing, and has a highly parallel structure that makes it more effective than general-purpose CPUs for algorithms where processing of large blocks of data is done in parallel.

Thus, as configured herein, processing system 1100 includes processing capability in the form of processors 1121, storage capability including system memory (e.g., RAM 1124), and mass storage 1134, input means such as keyboard 1129 and mouse 1130, and output capability including speaker 1131 and display 1135. In some aspects of the present disclosure, a portion of system memory (e.g., RAM 1124) and mass storage 1134 collectively store an operating system to coordinate the functions of the various components shown in processing system 1100.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method comprising:
   generating, by a processing device, a batch table and a mode table;
   determining, by the processing device, image processing performance requirements for a current mode of a vehicle using the mode table, the vehicle comprising a plurality of cameras configured to capture a plurality of images;
   selecting, by the processing device, a batch size and a processing frequency based at least in part on the image processing performance requirements for the current mode of the vehicle; and
   processing, by an accelerator, at least a subset of the plurality of images based at least in part on the batch size and processing frequency.

2. The computer-implemented method of claim 1, further comprising:
   determining, by the processing device, whether the batch size is greater than a number of the plurality of cameras.

3. The computer-implemented method of claim 2, further comprising:
based at least in part on determining that the batch size is greater than the number of the plurality of cameras, setting a batch size b equal to a number of frames remaining in a current column plus (b−r) % n frames from a next column, where b represents the batch size, r represents the frames remaining in the current column, and n represents a number of cameras.

4. The computer-implemented method of claim 2, further comprising:
based at least in part on determining that the batch size is not greater than the number of the plurality of cameras, setting a batch size b equal to a number of r frames remaining in a current column plus (b−r) frames in a next column, where b represents the batch size and r represents the frames remaining in the current column.

5. The computer-implemented method of claim 1, wherein the current mode of the vehicle is selected from a group comprising a highway driving mode, an urban driving mode, a parking mode, and a degraded mode.

6. The computer-implemented method of claim 1, wherein processing the at least a subset of the plurality of images is performed using a convolutional neural network.

7. The computer-implemented method of claim 1, wherein the batch table comprises a plurality of batch sizes, each of the plurality of batch sizes having a frequency value and a latency value associated therewith.

8. The computer-implemented method of claim 1, wherein the mode table comprises a plurality of modes of the vehicle, each of the plurality of modes having a camera configuration value and a latency requirement associated therewith.

9. The computer-implemented method of claim 1, wherein the plurality of cameras comprises at least one surround view camera and at least one long range camera.

10. The computer-implemented method of claim 1, further comprising:
prior to the processing, determining, by the processing device, whether a latency requirement is met based at least in part on the batch size.

11. The computer-implemented method of claim 10, further comprising:
based at least in part on determining that the latency requirement is not met, reverting, by the processing device, to a safe batch size, wherein the safe batch size is used to perform the processing.

12. A system comprising:
a memory comprising computer readable instructions; and
a processing device for executing the computer readable instructions for performing a method comprising:
generating, by the processing device, a batch table and a mode table;
determining, by the processing device, image processing performance requirements for a current mode of a vehicle using the mode table, the vehicle comprising a plurality of cameras configured to capture a plurality of images;
selecting, by the processing device, a batch size and a processing frequency based at least in part on the image processing performance requirements for the current mode of the vehicle; and
processing, by an accelerator, at least a subset of the plurality of images based at least in part on the batch size and processing frequency.

13. The system of claim 12, wherein the method further comprises:
determining, by the processing device, whether the batch size is greater than a number of the plurality of cameras.

14. The system of claim 13, wherein the method further comprises:
based at least in part on determining that the batch size is greater than the number of the plurality of cameras, setting a batch size b equal to a number of frames remaining in a current column plus (b−r) % n frames from a next column, where b represents the batch size, r represents the frames remaining in the current column, and n represents a number of cameras.

15. The system of claim 13, wherein the method further comprises:
based at least in part on determining that the batch size is not greater than the number of the plurality of cameras, setting a batch size b equal to a number of r frames remaining in a current column plus (b−r) frames in a next column, where b represents the batch size and r represents the frames remaining in the current column.

16. The system of claim 12, wherein the current mode of the vehicle is selected from the group consisting of a highway driving mode, an urban driving mode, a parking mode, and a degraded mode.

17. The system of claim 12, wherein processing the at least a subset of the plurality of images is performed using a convolutional neural network.

18. The system of claim 12, wherein the batch table comprises a plurality of batch sizes, each of the plurality of batch sizes having a frequency value and a latency value associated therewith.

19. The system of claim 12, wherein the mode table comprises a plurality of modes of the vehicle, each of the plurality of modes having a camera configuration value and a latency requirement associated therewith.

20. A computer program product comprising:
a computer readable storage medium having program instructions embodied therewith, the program instructions executable by a processing device to cause the processing device to perform a method comprising:
generating, by the processing device, a batch table and a mode table;
determining, by the processing device, image processing performance requirements for a current mode of a vehicle using the mode table, the vehicle comprising a plurality of cameras configured to capture a plurality of images;
selecting, by the processing device, a batch size and a processing frequency based at least in part on the image processing performance requirements for the current mode of the vehicle; and
processing, by an accelerator, at least a subset of the plurality of images based at least in part on the batch size and processing frequency.

* * * * *